R. A. FESSENDEN.
AMPLIFYING ELECTRICAL IMPULSES.
APPLICATION FILED MAR. 11, 1911.

1,154,750. Patented Sept. 28, 1915.

Witnesses:
A. Kennelly Fessenden

Inventor:
Reginald A. Fessenden

UNITED STATES PATENT OFFICE.

REGINALD A. FESSENDEN, OF BRANT ROCK, MASSACHUSETTS.

AMPLIFYING ELECTRICAL IMPULSES.

1,154,750.

Specification of Letters Patent.

Patented Sept. 28, 1915.

Application filed March 15, 1911. Serial No. 614,760.

*To all whom it may concern:*

Be it known that I, REGINALD A. FESSENDEN, a citizen of the United States, and resident of Brant Rock, in the county of Plymouth and State of Massachusetts, have invented a new and useful Improvement in Amplifying Electrical Impulses, of which the following is a specification.

My invention relates to the amplification of electric impulses and more particularly cable signals.

Figure 1:
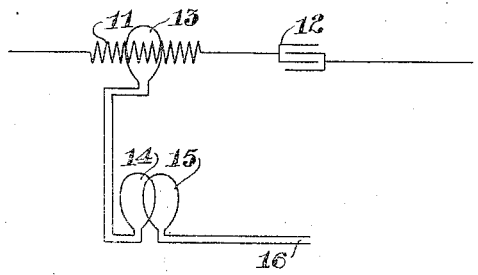
Figure 2:
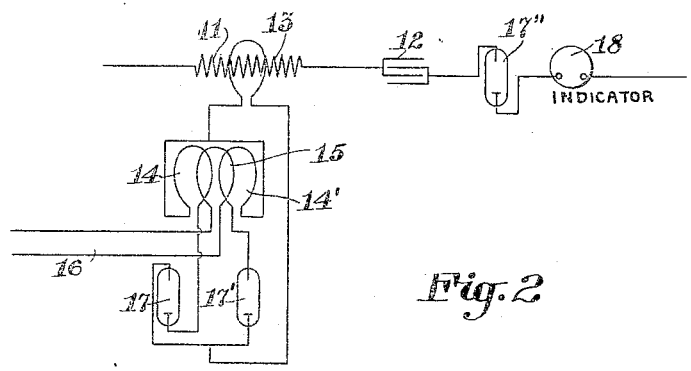

In the accompanying drawings, Figures 1 and 2 show diagrammatically suitable alternative arrangements for carrying out my invention.

My invention involves methods of and means for amplifying small amounts of electrical energy or feeble electric impulses so as to produce larger indications without the necessary use of microphonic contacts in the amplifying circuit or the use of moving members, inasmuch as the reaction between the prime circuit and the amplifying circuit is due to other stresses, specifically the stresses created by two interacting magnetic fields. The elimination of such contacts or moving members is advantageous because if they are not employed the amplification is not limited by friction, inertia, or other retarding factors.

In practising my invention I employ a circuit energised by alternating current and including an inductance and a capacity. A second circuit is connected inductively, preferably by magnetic induction, to the first circuit, and a third circuit whose impulses are to be amplified is connected inductively to the second circuit. The second circuit may be omitted if desired and the third circuit connected inductively to the first circuit without the interposition of the second circuit.

In Fig. 1, 11 is an inductance and 12 a capacity through which flows an alternating current of fixed frequency, the inductance and capacity being so arranged that the circuit is resonant, or approximately resonant, to the frequency of said alternating current. 13 is a single loop inductively connected to the inductance 11 and conductively connected to loop 14. 15 is a loop inductively connected to the loop 14 and conductively connected to the circuit 16, the impulses of which are to be amplified. When the impulses flow through the prime circuit 15, 16, a larger change of energy takes place in the amplifying circuit 11, 12 than in the original circuit 15, 16. In other words, the energy of the impulses flowing in the prime circuit 15, 16 is translated to amplifying circuit 11, 12 and causes the development in the latter circuit of similar impulses of much greater amplitude than those in the prime circuit.

In the arrangement shown in Fig. 1, the impulses to be amplified preferably have a frequency in the neighborhood of the frequency of the alternating current in the circuit which includes the inductance 11 and capacity 12. Where the impulses to be amplified have a much lower or higher frequency than those in the circuit 11, 12 the arrangement shown in Fig. 2 may be used where the circuit 13, 14 is split into two parts, there being two coils 14, 14' and rectifiers 17, 17' in series with each coil. A rectifier 17'' and an indicating instrument 18 may also be inserted in the circuit 11, 12. The circuit 15, 16 is inductively connected to 14, 14' and the rectifiers 17, 17' are arranged so as to rectify currents in opposite senses. In this way the energy of the impulses, such for example as low frequency impulses from a cable, transmitted through the circuit 15, 16 is translated to the circuit 11, 12 and causes the development in the latter circuit of similar impulses of much greater amplitude than those in the original circuit.

I have demonstrated practically that when the natural period of the amplifying circuit 11, 12 is equal to that of the alternating current energizing the same, or approximately equal thereto, feeble electric impulses in the prime circuit will cause to be developed in the amplifying circuit pulsations which correspond to those of the prime circuit but which are characterized by much larger changes of energy than the original impulses. Though the operation is readily demonstratable in practice, the theory is complicated, and broadly speaking is believed to depend on the fact that when current variations or impulses are generated in the circuit 15, the inductance, and therefore the degree of resonance relative to the alternating current in the circuit 11, 12, is also caused to vary.

In view of the foregoing it will be clear that I do not depend for amplification upon the production of beats of mechanical frequency by the cooperation of two differing frequencies as claimed in United States Letters Patent No. 1,050,441 issued January 14, 1913 upon my application and that such amplification is produced quite independently of any relation between the frequency of the impulses in the prime circuit and the frequency to which the amplifying circuit is tuned. There is in fact no necessary relation between these two frequencies, and any resonance that may exist is merely incidental. If, however, as above stated, the impulses to be amplified have a frequency in the neighborhood of the frequency of the alternating current which energizes the amplifying circuit, there will of course be produced in the latter circuit a certain resonant effect, and if the impulses to be amplified are of substantial amplitude, this resonance effect will be immaterial. My invention, however, is intended chiefly to be employed in those situations where the amplitude of the impulses in the prime circuit is so minute that the amplification thereof by a highly resonant circuit would be ineffective, even assuming that such impulses consisted of sustained alternating currents of definite frequency.

While I have spoken of my invention as particularly adapted to the amplification of cable signals, and while by means thereof high speed cable signals which on account of the electrostatic capacity of the cable are practically negligible and ordinarily undetectable, may be magnified and rendered readable, nevertheless it will be understood that my invention is of more general application, and therefore having specifically described two illustrative embodiments of my invention and particularly set forth what I believe to be the principle underlying the same, without, however, limiting my invention thereto,

What I claim and desire to secure by Letters Patent is—

1. The combination with a prime circuit carrying feeble electric impulses of an amplifying circuit carrying alternating current and containing an inductance and capacity, said amplifying circuit being tuned to the frequency of said alternating current, fixed means inductively associating said circuits, and a rectifier in said amplifying circuit.

2. The combination with a prime circuit carrying feeble electric impulses of an amplifying circuit carrying alternating current and containing an inductance and capacity, said amplifying circuit being tuned to the frequency of said alternating current, fixed means inductively associating said circuits, an indicating device and a rectifier in said amplifying circuit.

3. The combination with a prime circuit carrying feeble electric impulses to be amplified, of an amplifying circuit carrying alternating current and containing an inductance and capacity, said amplifying circuit being tuned to the frequency of said alternating current, and fixed means inductively associating said circuits, said means comprising a split circuit having oppositely arranged rectifiers in its respective branches.

4. The combination with a prime circuit carrying feeble electrical impulses to be amplified, of an amplifying circuit carrying alternating current and containing an inductance and capacity, said amplifying circuit being tuned to the frequency of said alternating current, fixed means inductively associating said circuits, said means comprising a split circuit having oppositely arranged rectifiers in its respective branches, and an indicating device in said amplifying circuit.

5. The combination with a prime circuit carrying feeble electrical impulses to be amplified, of an amplifying circuit carrying alternating current and containing an inductance and capacity, said amplifying circuit being tuned to the frequency of said alternating current, fixed means inductively associating said circuits, said means comprising a split circuit having oppositely arranged rectifiers in its respective branches, and a rectifier in said amplifying circuit.

6. The combination with a prime circuit carrying feeble electrical impulses to be amplified, of an amplifying circuit carrying alternating current and containing an inductance and capacity, said amplifying circuit being tuned to the frequency of said alternating current, fixed means inductively associating said circuits, said means comprising a split circuit having oppositely arranged rectifiers in its respective branches, an indicating device, and a rectifier in said amplifying circuit.

Signed at Brant Rock in the county of Plymouth and State of Massachusetts this 20th day of January A. D. 1911.

REGINALD A. FESSENDEN.

Witnesses:
    JESSIE E. BENT,
    THOMAS B. BLACKMAN.